April 28, 1936.    R. HALL    2,039,246
METER
Filed July 18, 1933    2 Sheets-Sheet 1
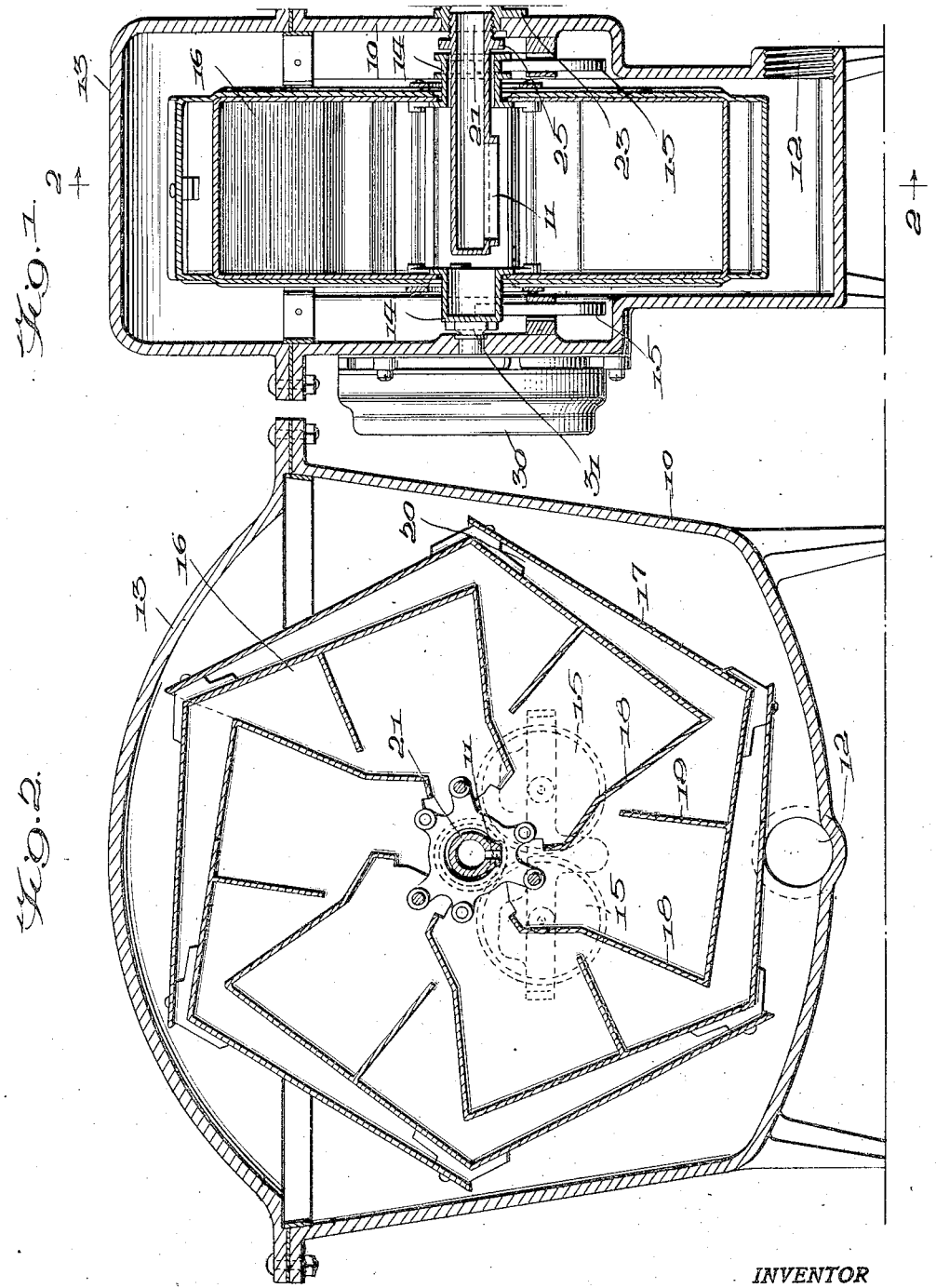
INVENTOR
Robert Hall,
BY Edmund H. Parry
ATTORNEY

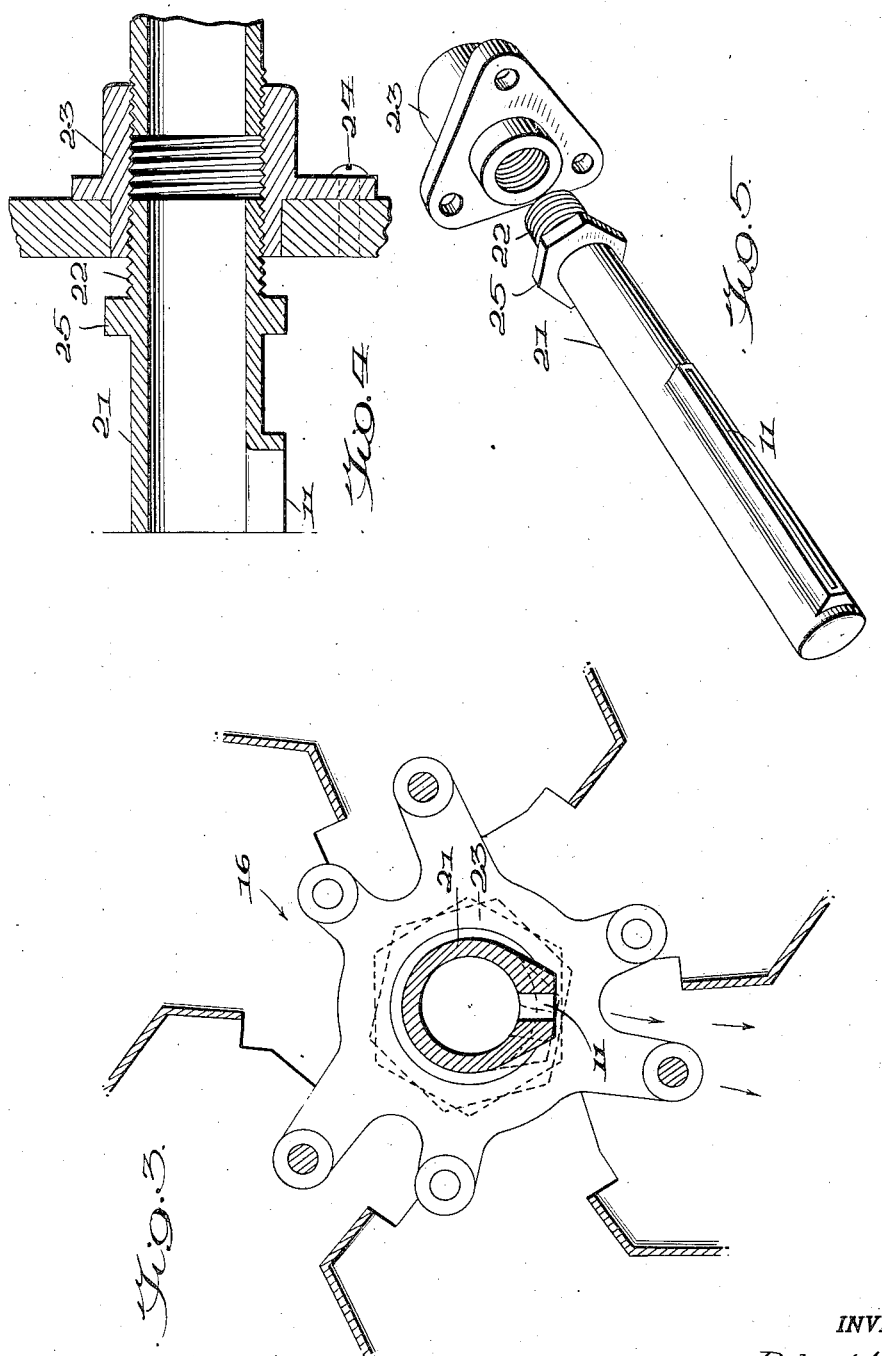

Patented Apr. 28, 1936

2,039,246

UNITED STATES PATENT OFFICE 2,039,246

METER

Robert Hall, Lockport, N. Y., assignor to American District Steam Company, North Tonawanda, N. Y., a corporation of New York Application July 18, 1933, Serial No. 681,020

1 Claim. (Cl. 73—37)

This invention relates to flow meters, and particularly to meters of the type shown in the patent to Everett R. Benedict, No. 1,649,653, dated November 15, 1927, in which a casing is provided having revolubly mounted therein a rotor consisting of a plurality of measuring buckets. A fluid inlet pipe extends into the casing and discharges the liquid to be measured into the rotor in the form of a radial stream. Each bucket coming into alignment with the discharge opening of the inlet pipe is filled and then discharged causing partial rotation of the rotor to bring the next bucket into operative position. The rotor as it revolves operates registering mechanism which measures the rate of flow of liquid through the meter.

A serious objection to such meters is that they frequently give inaccurate measurements of the rate of flow, the error in accuracy sometimes running as high as four per cent. Such inaccuracy is serious as the meters are of considerable capacity and may have to handle rates of flow varying within a range roughly between 100 and 6,000 pounds of liquid per hour. A common use of the meter is for the measurement of steam condensed in heating systems where the steam is produced in a central plant and sold commercially. It is evident, therefore, that over periods of days, weeks or months, the error above referred to is of considerable consequence and materially detracts from the value and use of the meters.

I have discovered the causes which give rise to these errors in measurement and an effective manner of overcoming the same. It is the broad object of the present invention to provide an improvement in meter construction which results in a greatly increased efficiency.

Tests show that no matter how carefully meters are constructed in accordance with fixed specifications, different meters are likely to give different measurements and each meter will have a greater or lesser accuracy under different rates of flow. These peculiarities have been traced to the discharge nozzle, or opening, in the inlet pipe which feeds liquid to the successive buckets of the rotor in a radial direction. I have discovered that due probably to slight irregularities in the contour of the nozzle, capillary attraction, surging effects and improper positioning of the nozzle radially of the rotor, there will be a difference in the direction of the liquid stream in different meters and even in the same meter under varying conditions, with the result that the liquid stream tends to discharge into two of the rotor measuring buckets simultaneously and thus prevents the revolution of the rotor in strict accordance with the rate of flow of the liquid and a true measurement by the registering mechanism.

In overcoming the error in efficiency of flow meters it is the specific object of the present invention to eliminate or compensate for directional influences that cause the liquid to be discharged from the inlet nozzle into the rotor in an improper manner and insure the feed of liquid into each measuring bucket only when each is successively brought into general radial alignment with the nozzle. To this end the nozzle is so constructed and arranged that the direction of flow of liquid therefrom may be controlled in each individual meter in accordance with the peculiarities of the nozzle therein and the conditions under which the meter works, thus insuring balanced operation and smooth rotation of the rotor and accurate measurement by the registering means.

To make the invention clear I will describe one particular embodiment thereof as illustrated in the accompanying drawings wherein:

Fig. 1 is a transverse sectional elevation of a meter incorporating the present invention;

Fig. 2 is a longitudinal sectional elevation along the line 2—2 of Fig. 1;

Fig. 3 is an enlarged detailed view corresponding to Fig. 2, and showing particularly the liquid inlet nozzle and the mounting of the buckets with respect thereto;

Fig. 4 is a longitudinal section through the inlet nozzle showing its fitting with the casing wall; and Fig. 5 is a detailed view in perspective showing the liquid inlet nozzle and fittings as constructed in accordance with the present invention.

Meters of the type illustrated comprise a casing 10 having a radially directed liquid inlet opening or nozzle 11, and an outlet 12. A closure top 13 is detachably secured to the casing in any desired manner, and a gasket is positioned between the flanges of the casing and the top to effect a seal. Revolubly mounted in the casing are stub shafts 14 and supported by frictionless bearings such as 15 is a rotor 16 comprising a series of nested measuring buckets 17 of predetermined capacity. The buckets are constructed to include an end wall 18 and a baffle 19, and are nested to provide a liquid discharge 20. The end walls of adjacent buckets extend radially of the rotor and are in proximate spaced relation at their inner extremities to define relatively narrow open ends for the buckets through which liquid is supplied as the buckets are brought into general alignment with the stream of liquid from the nozzle 11. As more fully hereinafter described the nozzle or opening 11 is disposed in the side of an inlet pipe 21 extending centrally of the rotor and receiving the supply of liquid to be measured from outside the casing.

Liquid flows through the inlet pipe and discharges as a stream directed radially of the rotor through the nozzle into the buckets as they successively come into position. As the liquid fills a bucket, the weight of the liquid causes the rotor to revolve, allowing the liquid to overflow the baffle 19 and pass out into the casing through the discharge 20, and at the same time bringing the next bucket into line with the stream from the nozzle. The revolution of the rotor actuates a registering mechanism generally designated by the numeral 30 through a key 31 which engages the stub shaft 14.

Referring to Figure 2 in connection with the operation just described, it will be evident that due to the directional influences heretofore mentioned a part of the stream of liquid is likely to flow into the bucket adjacent the one in alignment with the nozzle. That is to say, part, even the major portion of the stream of liquid may be discharged into the proper bucket, but some of the liquid will at the same time be directed on the wrong side of the end wall 18 into the bucket next to be filled, with the result that the rotor will be revolved before the first bucket has received its full measured quantity of liquid.

In accordance with the present invention arrangement is made whereby the nozzle 11 may be moved radially with respect to the axis of the inlet pipe 21 so that the same may be turned or rotated relative to the rotor and casing so as to compensate for peculiarities of the particular nozzle under varying operating conditions.

In the embodiment illustrated in the drawings the inlet pipe 21, including its side nozzle 11, is arranged to be conveniently turned with respect to the casing. To this end, as best illustrated in Figures 4 and 5, the inlet pipe is provided with a threaded outer end 22, adapted to be supported by the casing so as to permit the inlet pipe to be turned with respect to the latter. In lieu of threading the pipe end directly to an opening in the casing wall it may be advisable to insert a fitting or coupling 23 in the side of the casing and secured thereto as by bolts 24, the coupling having an elongated and threaded bore accurately coinciding with and receiving the threaded end of the inlet pipe. The close fit is desired to prevent leakage and accidental turning of the nozzle. By this arrangement it will be evident that change of position of the nozzle in the inlet pipe with respect to the rotor may be readily effected.

To facilitate control of the direction of flow of liquid through the nozzle it is found desirable to provide the inlet pipe with an integral tool engaging surface such as the nut 25. As best shown in Figures 1 and 3 such element may be conveniently interposed on the pipe between the casing wall and the rotor, thus enabling corrections to be made while the meter is in operation by merely removing the casing top 13.

Thus it will be seen that I have provided a meter for measuring the flow of liquids which overcomes the difficulties present in prior devices and which will be accurate by virtue of the fact that the stream of liquid entering the meter is subject to control compensatory of unfavorable influences under various operating conditions such as will assure the discharge of liquid into the proper bucket and balanced revolution of the rotor.

I claim:

A liquid measuring meter including a casing, an inlet pipe mounted thereon having a side opening for discharging liquid, a rotor revoluble about said inlet pipe within the casing having a plurality of partitions extending substantially radially and dividing the rotor into a series of individual buckets with relatively narrow open inner ends which are adapted to communicate with the discharge opening in the inlet pipe as the rotor revolves to bring each bucket successively into general alignment with said opening, and securing means for the inlet pipe adapted to determine the fixed operating position of the discharge opening and compensate for directional influences acting on the liquid as it discharges through said opening tending to cause part thereof to be discharged into other buckets than the single bucket in general alignment with the discharge opening, said securing means comprising an adjustable fitting mounted on the side of the casing constructed to maintain the inlet pipe stationary during operation of the meter but permitting said pipe to be turned relative to the casing as required to cause the flow of liquid from the discharge opening to assume a desired direction relative to the rotor and insure discharge of the liquid into only one rotor bucket at a time.

ROBERT HALL.